US012634440B2

(12) United States Patent
Li et al.

(10) Patent No.: US 12,634,440 B2
(45) Date of Patent: May 19, 2026

(54) MULTI-FRAME MOTION COMPENSATION SYNTHESIS FOR VIDEO CODING

(71) Applicant: Google LLC, Mountain View, CA (US)

(72) Inventors: Bohan Li, Santa Clara, CA (US); Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/836,951

(22) PCT Filed: Mar. 7, 2022

(86) PCT No.: PCT/US2022/019189
§ 371 (c)(1),
(2) Date: Aug. 8, 2024

(87) PCT Pub. No.: WO2023/172243
PCT Pub. Date: Sep. 14, 2023

(65) Prior Publication Data
US 2025/0150574 A1       May 8, 2025

(51) Int. Cl.
H04N 19/105          (2014.01)
H04N 19/137          (2014.01)
(Continued)

(52) U.S. Cl.
CPC ......... H04N 19/105 (2014.11); H04N 19/137 (2014.11); H04N 19/172 (2014.11); H04N 19/176 (2014.11)

(58) Field of Classification Search
CPC .. H04N 19/105; H04N 19/137; H04N 19/172; H04N 19/176
See application file for complete search history.

(56) References Cited

U.S. PATENT DOCUMENTS

2013/0342644 A1* 12/2013 Rusanovskyy ...... H04N 19/597
                                                348/43
2018/0035127 A1*  2/2018 Fuldseth ............. H04N 19/176
                    (Continued)

FOREIGN PATENT DOCUMENTS

WO          2012/125178 A1       9/2012
WO          2020/015706 A1       1/2020
WO          2020/248925 A1      12/2020

OTHER PUBLICATIONS

International Search Report and Written Opinion of International Application No. PCT/US2022/019189, mailed Oct. 17, 2022, 16 pgs.

*Primary Examiner* — Jeremiah C Hallenbeck-Huber
(74) *Attorney, Agent, or Firm* — Young Basile Hanlon & MacFarlane, P.C.

(57)       ABSTRACT

A motion vector for a current block of a current frame is decoded. The motion vector for the current block refers to a first reference block in a first reference frame. A first prediction block of two or more prediction blocks is identified in the first reference frame and using the first reference block. A first grid-aligned block is identified based on the first reference block. A second reference block is identified using a motion vector of the first grid-aligned block in a second reference frame. A second prediction block of the two or more prediction blocks is identified in the second reference frame and using the second reference block. The two or more prediction blocks are combined to obtain a prediction block for the current block.

20 Claims, 11 Drawing Sheets

(51) Int. Cl.
  *H04N 19/172* (2014.01)
  *H04N 19/176* (2014.01)

(56) References Cited

U.S. PATENT DOCUMENTS

| | | | | |
|---|---|---|---|---|
| 2019/0007699 A1* | 1/2019 | Liu | ...................... | H04N 19/139 |
| 2019/0098329 A1* | 3/2019 | Han | ...................... | H04N 19/176 |
| 2019/0230350 A1* | 7/2019 | Chen | .................... | H04N 19/139 |
| 2019/0356922 A1* | 11/2019 | Park | .................... | H04N 19/109 |
| 2020/0177909 A1* | 6/2020 | Chang | .................. | H04N 19/176 |
| 2021/0105482 A1* | 4/2021 | Zhang | .................... | H04N 19/30 |
| 2022/0224883 A1* | 7/2022 | Yea | ...................... | H04N 19/132 |

* cited by examiner

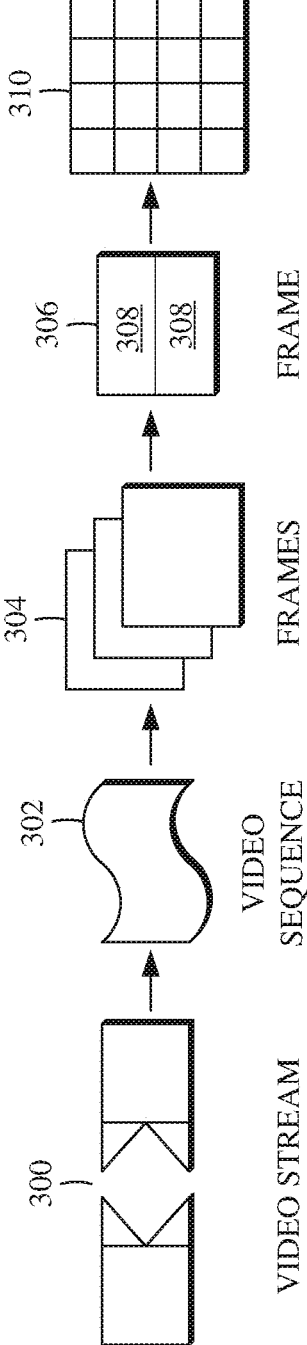
300 VIDEO STREAM
302 VIDEO SEQUENCE
304 FRAMES
306 FRAME
308 308
310
FIG. 3

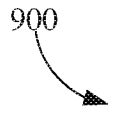

900

902

DECODE A MOTION VECTOR FOR A CURRENT BLOCK OF A CURRENT FRAME THAT REFERS TO A FIRST REFERENCE BLOCK IN A FIRST REFERENCE FRAME

904

IDENTIFY A FIRST PREDICTION BLOCK OF TWO OR MORE PREDICTION BLOCKS

906

IDENTIFY A FIRST GRID-ALIGNED BLOCK BASED ON THE FIRST REFERENCE BLOCK

908

IDENTIFY, USING A MOTION VECTOR OF THE FIRST GRID-ALIGNED BLOCK, A SECOND REFERENCE BLOCK IN A SECOND REFERENCE FRAME

910

IDENTIFY A SECOND PREDICTION BLOCK OF THE TWO OR MORE PREDICTION BLOCKS

912

COMBINE THE TWO OR MORE PREDICTION BLOCKS TO OBTAIN A PREDICTION BLOCK FOR THE CURRENT BLOCK

FIG. 9

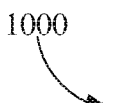

1000

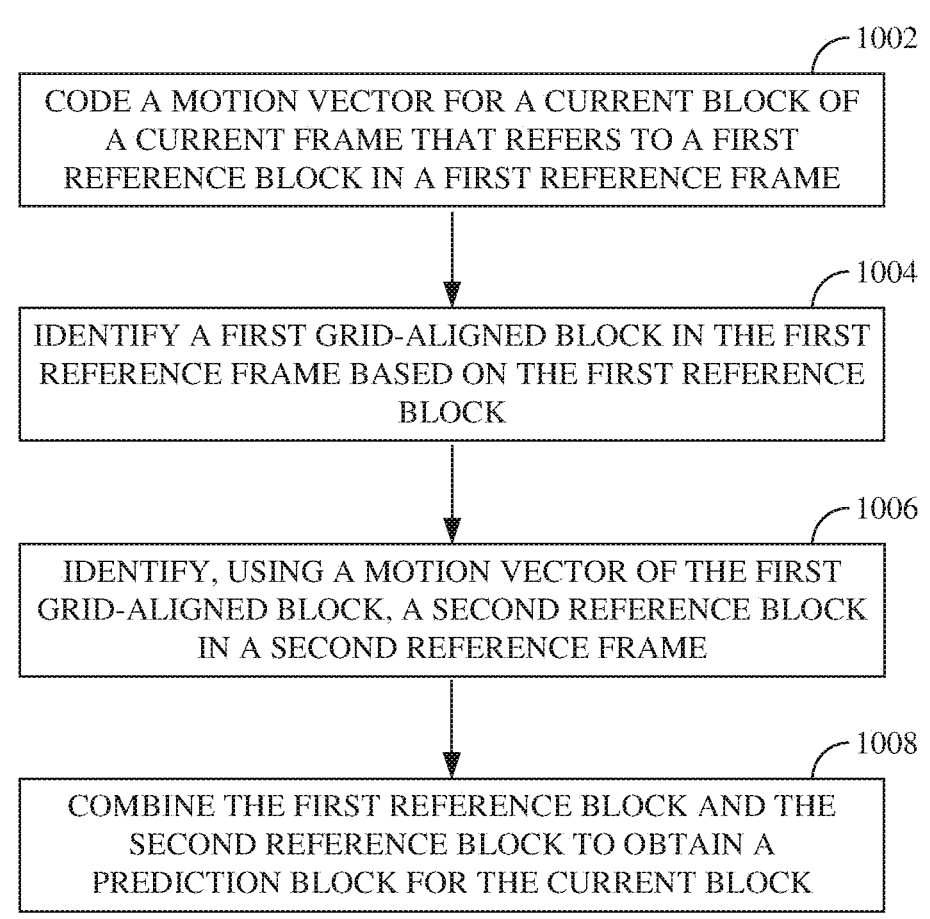

1002

CODE A MOTION VECTOR FOR A CURRENT BLOCK OF A CURRENT FRAME THAT REFERS TO A FIRST REFERENCE BLOCK IN A FIRST REFERENCE FRAME

1004

IDENTIFY A FIRST GRID-ALIGNED BLOCK IN THE FIRST REFERENCE FRAME BASED ON THE FIRST REFERENCE BLOCK

1006

IDENTIFY, USING A MOTION VECTOR OF THE FIRST GRID-ALIGNED BLOCK, A SECOND REFERENCE BLOCK IN A SECOND REFERENCE FRAME

1008

COMBINE THE FIRST REFERENCE BLOCK AND THE SECOND REFERENCE BLOCK TO OBTAIN A PREDICTION BLOCK FOR THE CURRENT BLOCK

FIG. 10

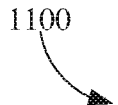
1100
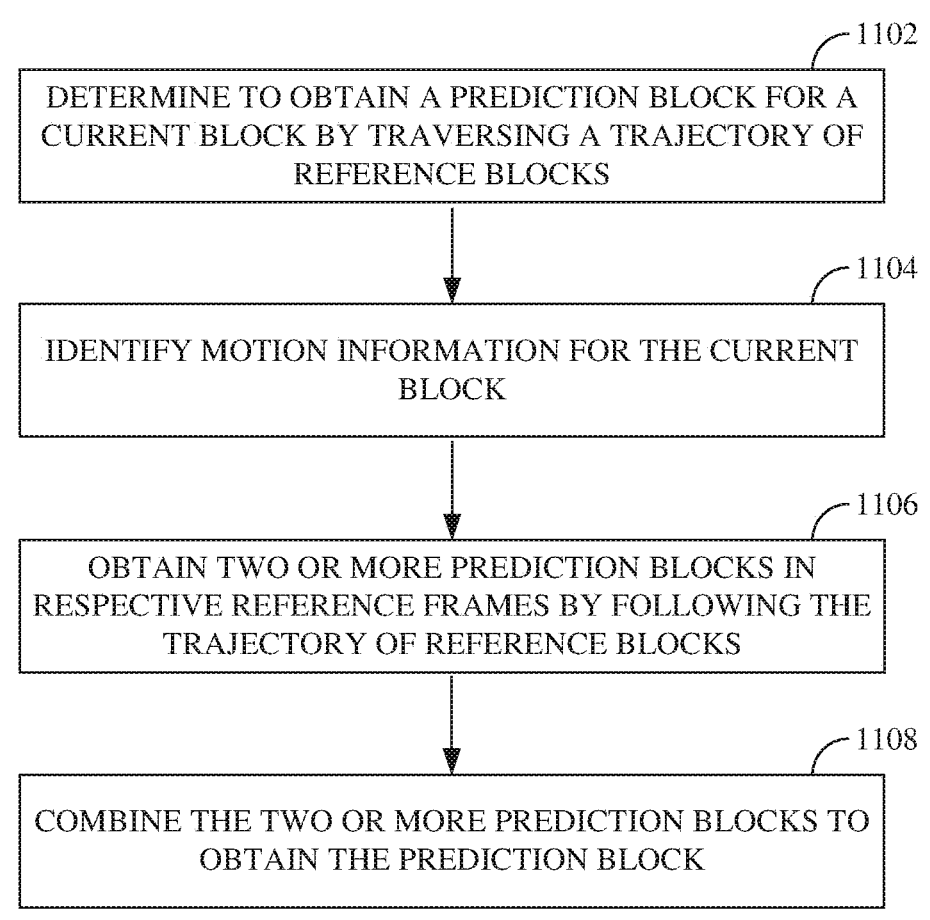
1102
DETERMINE TO OBTAIN A PREDICTION BLOCK FOR A
CURRENT BLOCK BY TRAVERSING A TRAJECTORY OF
REFERENCE BLOCKS
1104
IDENTIFY MOTION INFORMATION FOR THE CURRENT
BLOCK
1106
OBTAIN TWO OR MORE PREDICTION BLOCKS IN
RESPECTIVE REFERENCE FRAMES BY FOLLOWING THE
TRAJECTORY OF REFERENCE BLOCKS
1108
COMBINE THE TWO OR MORE PREDICTION BLOCKS TO
OBTAIN THE PREDICTION BLOCK
FIG. 11

MULTI-FRAME MOTION COMPENSATION SYNTHESIS FOR VIDEO CODING

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other coding techniques. These techniques may include both lossy and lossless coding techniques.

SUMMARY

This disclosure relates generally to encoding and decoding video data using reference frames and more particularly relates to encoding and decoding blocks of video frames using multi-frame motion compensation synthesis.

A first aspect is a method that includes decoding a motion vector for a current block of a current frame, where the motion vector for the current block refers to a first reference block in a first reference frame; identifying, in the first reference frame and using the first reference block, a first prediction block of two or more prediction blocks; identifying a first grid-aligned block based on the first reference block; identifying, using a motion vector of the first grid-aligned block, a second reference block in a second reference frame; identifying, in the second reference frame and using the second reference block, a second prediction block of the two or more prediction blocks; and combining the two or more prediction blocks to obtain a prediction block for the current block.

A second aspect is a device that includes a processor that is configured to identify a motion vector for a current block of a current frame, where the motion vector refers to a first reference block in a first reference frame; identify a first grid-aligned block in the first reference frame based on the first reference block; identify, using a motion vector of the first grid-aligned block, a second reference block in a second reference frame; and combine the first reference block and the second reference block to obtain a prediction block for the current block.

A third aspect is a method that includes determining to obtain a prediction block for a current block by traversing a trajectory of reference blocks; identifying motion information for the current block, where the motion information includes a motion vector and a first reference frame; obtaining two or more prediction blocks in respective reference frames by following the trajectory of reference blocks, where the trajectory identifies a first reference block in the first reference frame and uses a grid-aligned block proximal to the first reference block to identify a second reference block in a second reference frame that is used for coding blocks of the first reference frame; and combining the two or more prediction blocks to obtain the prediction block.

It will be appreciated that aspects can be implemented in any convenient form. For example, aspects may be implemented by appropriate computer programs which may be carried on appropriate carrier media which may be tangible carrier media (e.g. disks) or intangible carrier media (e.g.

communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below wherein like reference numerals refer to like parts throughout the several views.

FIG. 3 is a diagram of an example of a video stream to be encoded and subsequently decoded.

FIG. 9 is an example of a flowchart of a technique for obtaining a prediction of a current block using multi-frame motion compensation synthesis.

FIG. 10 is another example of a flowchart of a technique for obtaining a prediction of a current block using multi-frame motion compensation synthesis.

FIG. 11 is another example of a flowchart of a technique for obtaining a prediction of a current block using multi-frame motion compensation synthesis.

DETAILED DESCRIPTION

Figure 1:
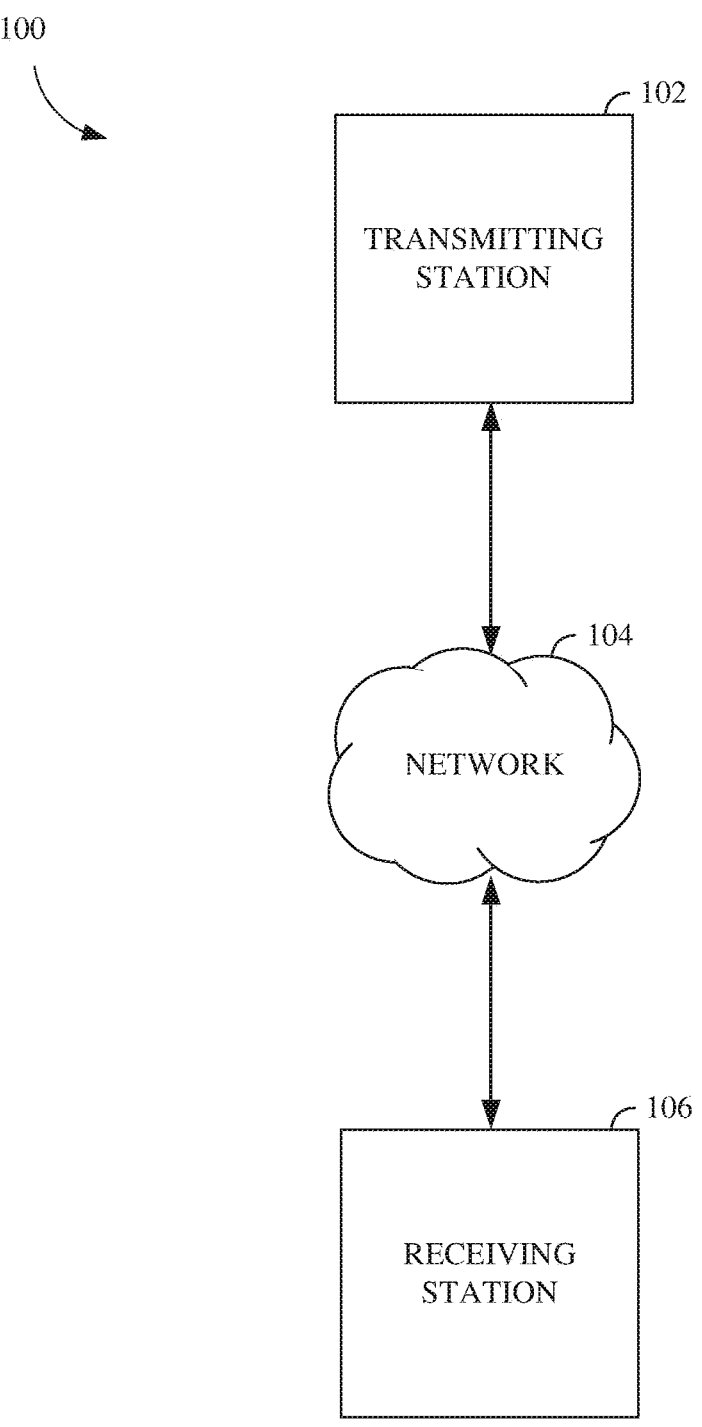
FIG. 1 is a schematic of a video encoding and decoding system.

As mentioned, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities is known as intra prediction. Intra prediction can attempt to predict the pixel values of a block of a frame of a video stream using pixels peripheral to the block; that is, using pixels that are in the same frame as the block but that are outside the block. Intra prediction can be performed along a direction of prediction where each direction can correspond to an intra prediction mode. The intra prediction mode can be signaled by an encoder to a decoder.

Encoding using temporal similarities is known as inter prediction or motion-compensated prediction (MCP). A prediction block of a current block (i.e., a block being coded) is generated by finding a corresponding block in a reference frame following a motion vector (MV). That is, inter prediction attempts to predict the pixel values of a block using a possibly displaced block or blocks from a temporally nearby frame (i.e., a reference frame) or frames. A temporally nearby frame is a frame that appears earlier or later in time in the video stream than the frame (i.e., the current frame) of the block being encoded (i.e., the current block).

A motion vector used to generate a prediction block refers to (e.g., points to or is used in conjunction with) a frame (i.e., a reference frame) other than the current frame. As mentioned, reference frames can be located (e.g., in display order) before or after the current frame in the sequence of the video stream. Some codecs use up to eight reference frames, which can be stored in reference frame buffers. The motion vector can refer to (i.e., use) one of the reference frames of the reference frame buffers. Reference frames may be decoded (e.g., reconstructed) frames of source frames. Reference frames may also be constructed (e.g., synthesized frame) that are not displayable frames and have no corresponding source frames.

Two prediction blocks can be combined to form a compound predictor for a block or region of a video image. A compound predictor can be created by combining two or more prediction blocks determined using, for example, the aforementioned prediction methods (i.e., inter and/or intra prediction). For example, a compound predictor can be combination of a first predictor and a second predictor which can be two intra predictors (i.e., intra+intra), an intra predictor and an inter predictor (i.e., intra+inter) or two inter predictors (i.e., inter+inter). For example, in the case of inter+inter, compound inter-prediction can employ a first motion vector to obtain a prediction block from a first reference frame, and a second motion vector to obtain a prediction block from a second reference frame. The reference frames can both be in the past, both in the future, or some combination thereof. The prediction blocks are then combined to obtain a final prediction block.

Compound inter-prediction is an example of what may generally be referred to as multi-hypothesis MCP. Multi-hypothesis MCP refers to predicting a current block using multiple (e.g., more than one) prediction blocks, each with a corresponding MV that refers to a corresponding reference frame. Multi-hypothesis MCP may provide better prediction quality than a single-reference MCP by utilizing information (e.g., pixel values) from multiple available reference frames. Using multi-hypothesis MCP may improve prediction quality and overcome issues associated with single reference MCP. Single reference MCP may be prone to source noise or quantization noise in reference blocks, which may degrade the prediction quality. By combining multiple prediction blocks, multi-hypothesis MCP may attenuate the noise in any one of the prediction blocks.

To reiterate, multi-hypothesis MCP uses more than one MV corresponding to the used prediction blocks (and, therefore, reference frames). Each of the prediction blocks constitutes or is considered to be a hypothesis for predicting the current block. A final prediction block may be obtained by synthesizing (e.g., combining) these hypotheses. An encoder may signal (e.g., encode in a compressed bitstream)

and a decoder may decode (read from the compressed bitstream) the MVs. As such, the compressed bitstream may include side information for each of the MVs and the corresponding reference frames (such as reference frame identifiers or indexes into the reference frame buffers).

Existing multi-hypothesis MCP techniques require a higher rate cost than single-reference MCP. The higher rate cost may be due to data in the compressed bitstream for the MVs and the reference frames. As such, the additional rate costs associated transmitting the MVs may reduce the overall compression efficiency. The Existing multi-hypothesis MCP techniques may incur additional motion search complexity at the encoder in order to identify the prediction blocks to be combined. With respect to the decoder side, the existing multi-hypothesis MCP techniques may also suffer from inaccuracies in the derivation of the MVs or from computational costs associated with the derivation of the MVs.

This disclosure describes implementations of multi-frame motion compensation synthesis. The disclosure describes an inter-prediction mode that is referred to as the "multi-frame motion compensation synthesis mode" or the "inter-prediction using reference-block trajectory mode." Starting with an initial MV (e.g., mv0) corresponding to a first reference block (e.g., b0) in an initial reference frame (e.g., r0) for a current block, multiple prediction blocks can be identified along a trajectory of the first reference block. The trajectory can be constructed using the initial MV and subsequent MVs of visited reference blocks along the trajectory.

To illustrate, using mv0, the first reference block may be identified. The first reference block may be inter-predicted and may have an associated MV, mv1, corresponding to a second reference block. A second prediction block can be identified using mv1. The second prediction block may in turn be inter-predicted and may have an associated MV, mv2, corresponding to a second reference frame. A third prediction block can be identified using mv2. And so on. The process may continue until a stopping condition is met. The prediction blocks along the trajectory (e.g., the first reference block, the second prediction block, the third prediction block, etc.) are combined to obtain the prediction block for the current block.

Implementations according to this disclosure yield no additional MV estimation complexity for both the encoder and the decoder as compared to a single MV (or, equivalently, single reference) MCP techniques. The techniques described herein require the same MV rate cost as single reference MCP techniques. Motion vectors associated with past reference frames that are previously decoded and buffered are utilized in obtaining multiple prediction blocks. The multiple prediction blocks are combined. Different weighting schemes are described for combining the multiple prediction blocks.

Further details of multi-frame motion compensation synthesis are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
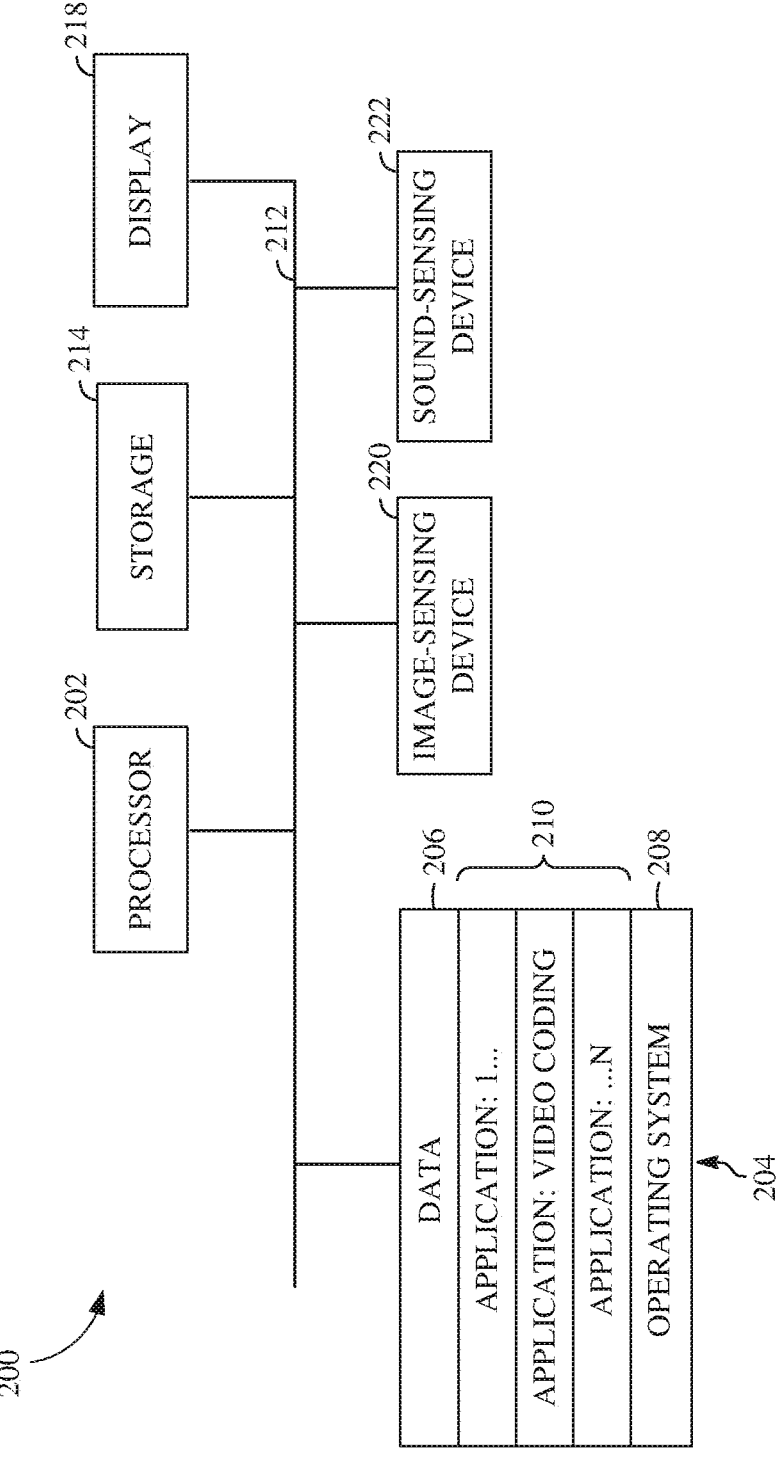
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a video streaming protocol based on the Hypertext Transfer Protocol (HTTP).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 (e.g., an apparatus) that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
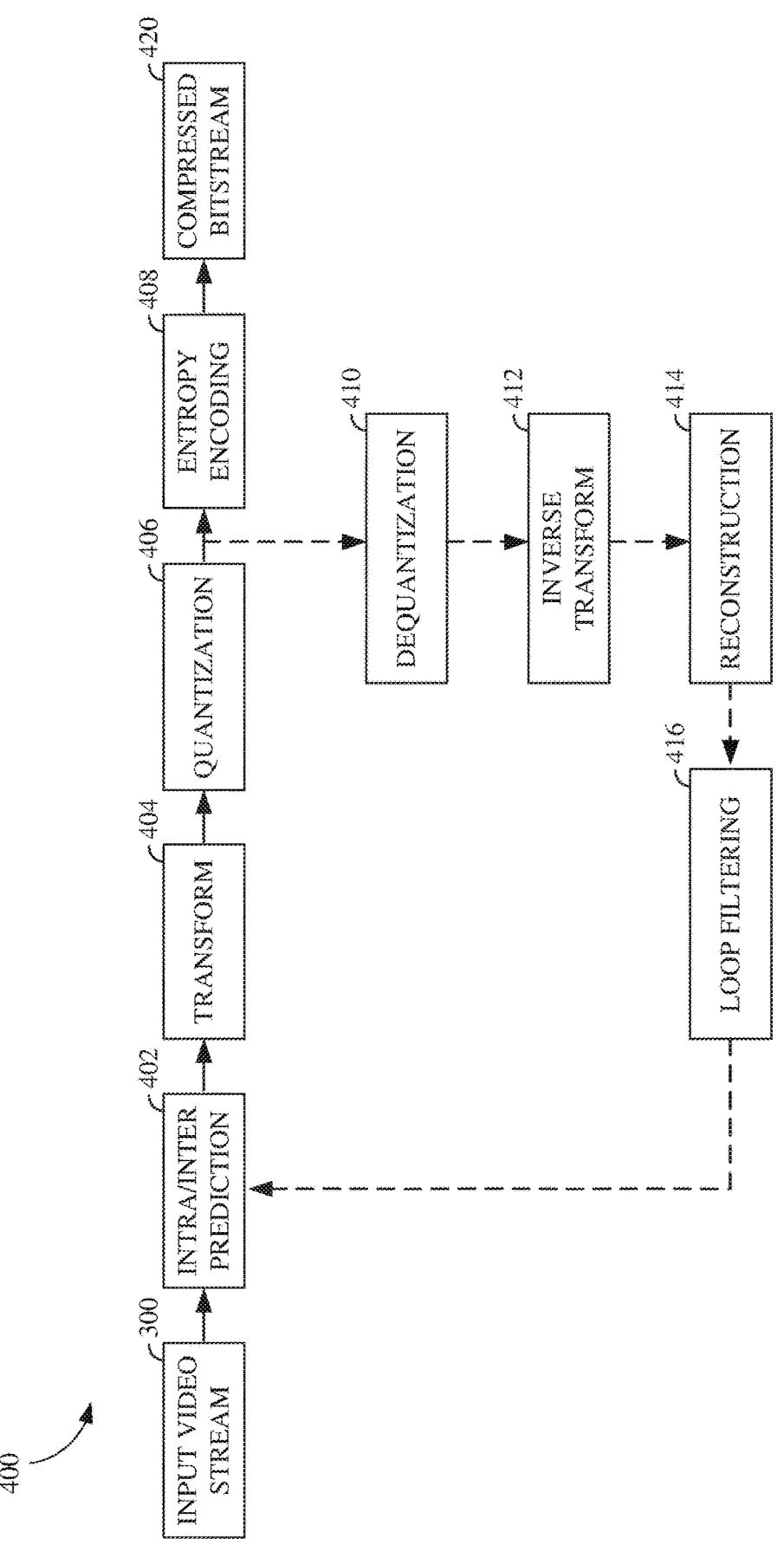
FIG. 4 is a block diagram of an encoder.

FIG. 4 is a block diagram of an encoder 400. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform-based encoder can quantize the residual signal directly without the transform stage 404 for certain blocks or frames. In another implementation, an encoder can have the quantization stage 406 and the dequantization stage 410 combined in a common stage.

Figure 5:
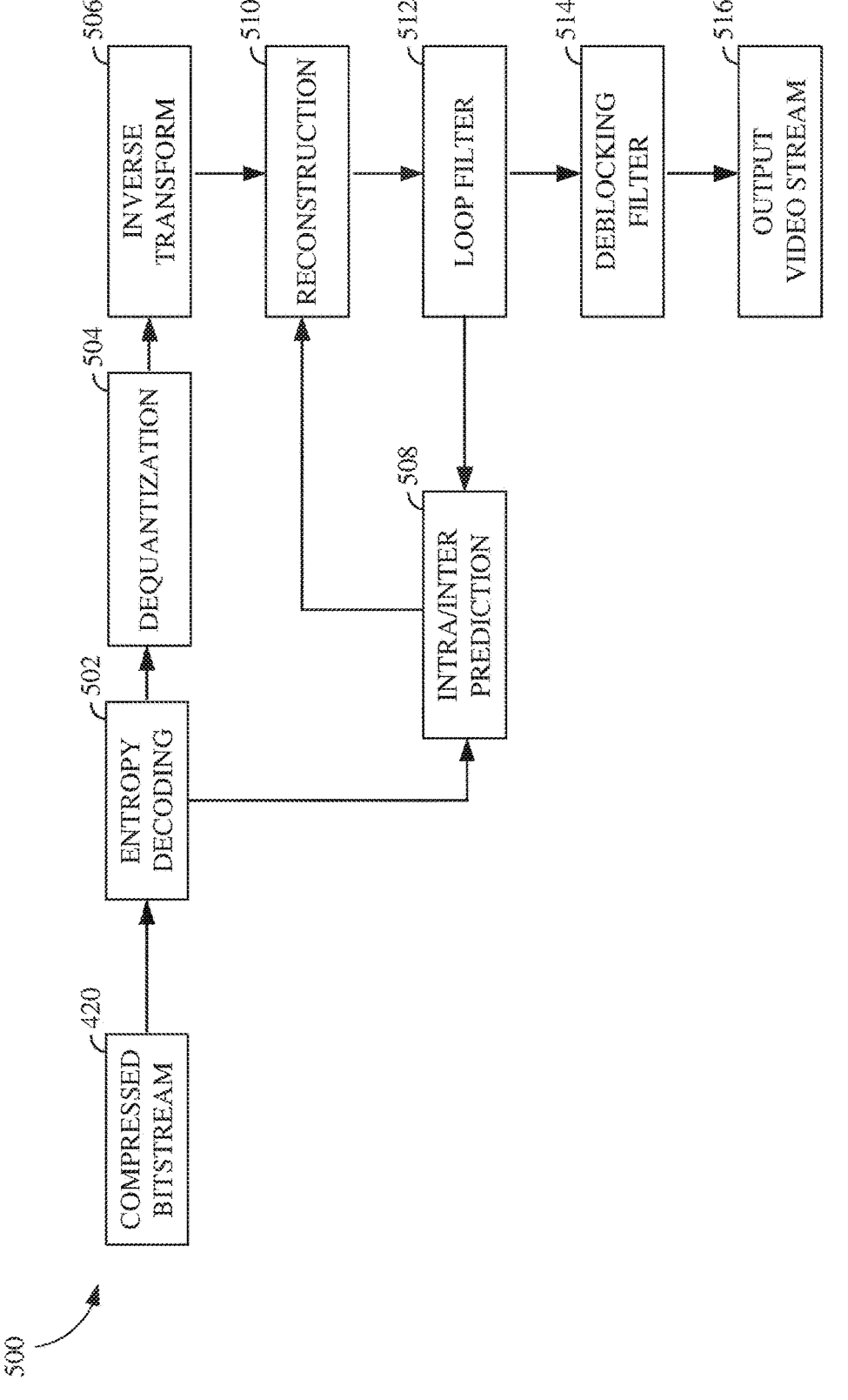
FIG. 5 is a block diagram of a decoder.

FIG. 5 is a block diagram of a decoder 500. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
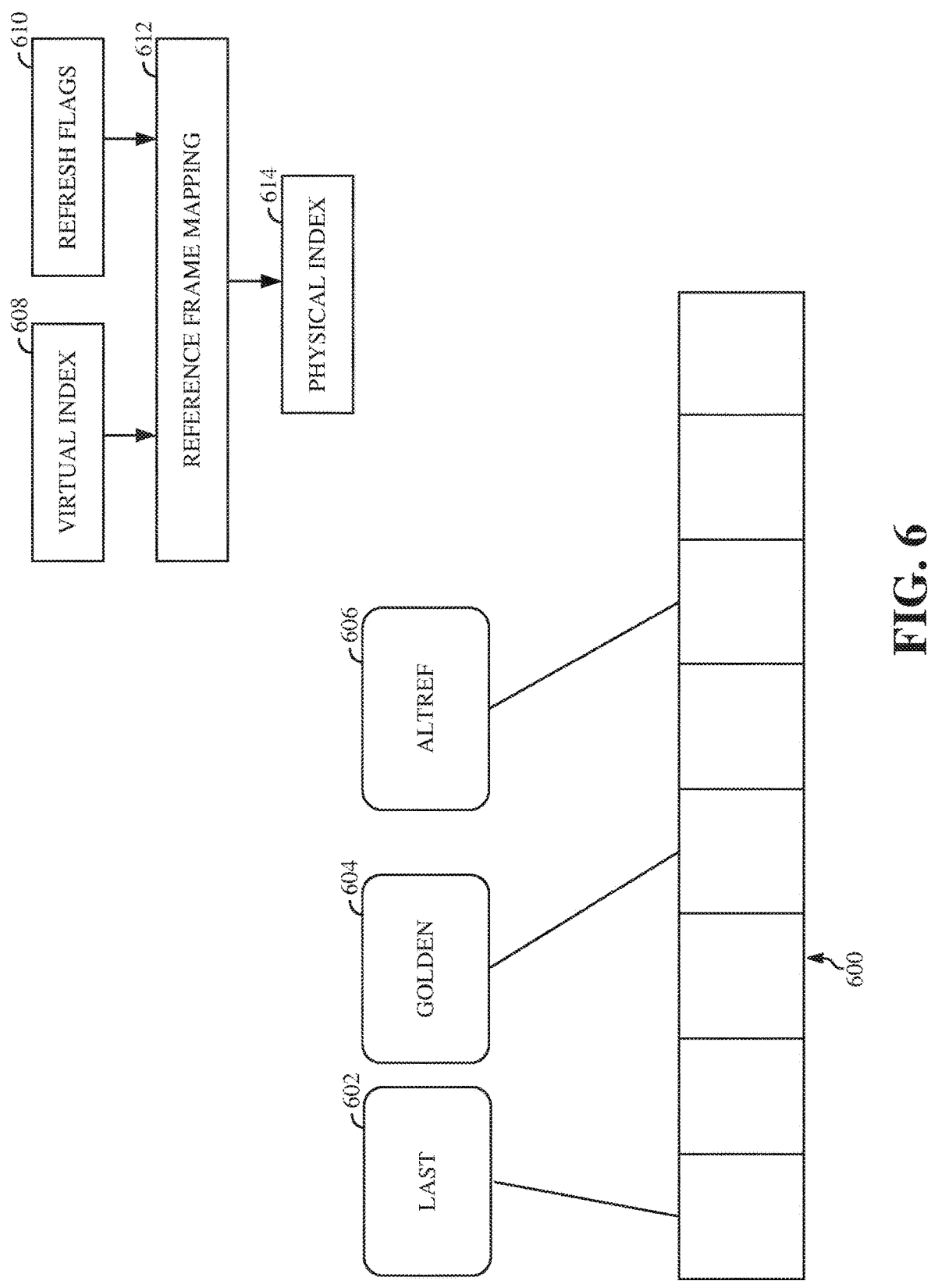
FIG. 6 is a block diagram of an example of a reference frame buffer.

FIG. 6 is a block diagram of an example of reference frame buffers 600. FIG. 6 illustrates that up to eight buffers can be maintained (e.g., stored) in the reference frame buffers 600. However, more of fewer reference frame buffers are possible. The reference frame buffers 600 store reference frames used to encode or decode blocks of frames of a video sequence. In this example, labels, roles, or types may be associated with or used to describe different reference frames identified (e.g., associated, stored, etc.) with respective buffers of the reference frame buffers 600. As described above with respect to inter prediction, a motion vector used to generate a prediction block refers to (i.e., uses) a reference frame that can be stored in one of the reference frame buffers 600.

The frame header of a current reference frame can include a virtual index 608 to a location within the reference frame buffers 600 at which the reference frame is stored. A reference frame mapping 612 can map the virtual index 608 of the reference frame to a physical index 614 of memory at which the reference frame is stored. One or more refresh flags 610 can be used to remove one or more of the stored reference frames from the reference frame buffers 600, for example, to clear space in the reference frame buffers 600 for a new reference frame, where there are no further blocks to encode or decode using the stored reference frames, where a new key frame is encoded or decoded, or some combination thereof. In an example of a frame level reference syntax, a (e.g., 8-bit) flag indicates which of the buffers of the reference frame buffers 600 to refresh with the current frame. Another component of the frame level reference syntax is a list of values indicating a mapping of buffers to named reference assignments. In this example, reference frames are assigned, named, identified, or otherwise designated as LAST frame 602, a GOLDEN frame 604, and an alternative reference (ALTREF) frame 606.

Generally, a group of frames of a video sequence that has a display order may be coded starting with a key frame. A key frame is a frame that is coded without reference to any other frame (e.g., its blocks are coded using intra-prediction). When the term coded or any of its variations is used herein, the term refers to either encoding or decoding unless otherwise clear from context that it refers to only one of encoding or decoding. The key frame, once reconstructed, is available as a reference frame for coding blocks of one or more subsequent frames of the group coded in a coding order, which may be different from the display order.

The LAST frame 602 can be, for example, the adjacent frame immediately preceding the current frame in the video sequence. The GOLDEN frame 604 can be, for example, a reconstructed video frame for use as a reference frame that may or may not be adjacent to the current frame. The ALTREF frame 606 can be, for example, a video frame in the non-adjacent future, which is a backward reference frame.

The reference frames stored in the reference frame buffers 600 can be used to identify motion vectors for predicting blocks of frames to be encoded or decoded. Different reference frames may be used depending on the type of prediction used to predict a current block of a current frame. For example, when compound prediction is used, multiple frames, such as one for forward prediction (e.g., LAST frame 602 or GOLDEN frame 604) and one for backward prediction (e.g., ALTREF frame 606) can be used for predicting the current block.

There may be a finite number of reference frames that can be stored within the reference frame buffers 600. As shown in FIG. 6, the reference frame buffers 600 can store up to eight reference frames. Although three of the eight spaces in the reference frame buffers 600 are used by the LAST frame 602, the GOLDEN frame 604, and the ALTREF frame 606, five spaces remain available to store other reference frames.

In particular, one or more available spaces in the reference frame buffers 600 may be used to store a second last (LAST2) frame and/or a third last (LAST3) frame as additional forward reference frames, in addition to the LAST frame 602. A backward (BWDREF) frame can be stored as an additional backward prediction reference frame, in addition to the ALTREF frame 606. The BWDREF frame can be closer in relative distance to the current frame than the ALTREF frame 606, for example.

A current block can be predicted based on a prediction mode. In the case of inter prediction, the prediction mode may be selected from one of multiple inter-prediction modes using one or more reference frames of the reference frame buffers 600 including, for example, the LAST frame 602, the GOLDEN frame 604, the ALTREF frame 606, or any other reference frame. In one example, the pair of {LAST, BWDREF} can be used to generate a compound predictor for coding the current block. In this example, LAST frame is a "nearest" forward reference frame for forward prediction, and BWDREF frame is a "nearest" backward reference frame for backward prediction.

The prediction mode of the current block can be transmitted from an encoder, such as the encoder 400 of FIG. 4, to a decoder, such as the decoder 500 of FIG. 5, in an encoded bitstream, such as the compressed bitstream 420 of FIGS. 4-5.

A bitstream syntax can support three categories of inter prediction modes in an example. These inter prediction modes can include a mode (referred to herein as the ZERO_MV mode) in which a block from the same location within a reference frame as the current block is used as the prediction block, a mode (referred to herein as the NEW_MV mode) in which a motion vector is transmitted to indicate the location of a block within a reference frame to be used as the prediction block relative to the current block, or a mode (referred to herein as the REF_MV mode and comprising a NEAR_MV or NEAREST_MV mode) in which no motion vector is transmitted and the current block uses the last or second-to-last non-zero motion vector used by neighboring, previously coded blocks to generate the prediction block. The previously coded blocks may be those coded in the scan order, e.g., a raster or other scan order, before the current block. Inter-prediction modes may be used with any of the available reference frames. NEAREST_MV and NEAR_MV can refer to the most and second most likely motion vectors for the current block obtained by a survey of motion vectors in the context for a reference. The reference can be a causal neighborhood in current frame. The reference can be co-located motion vectors in the previous frame.

Figure 7:
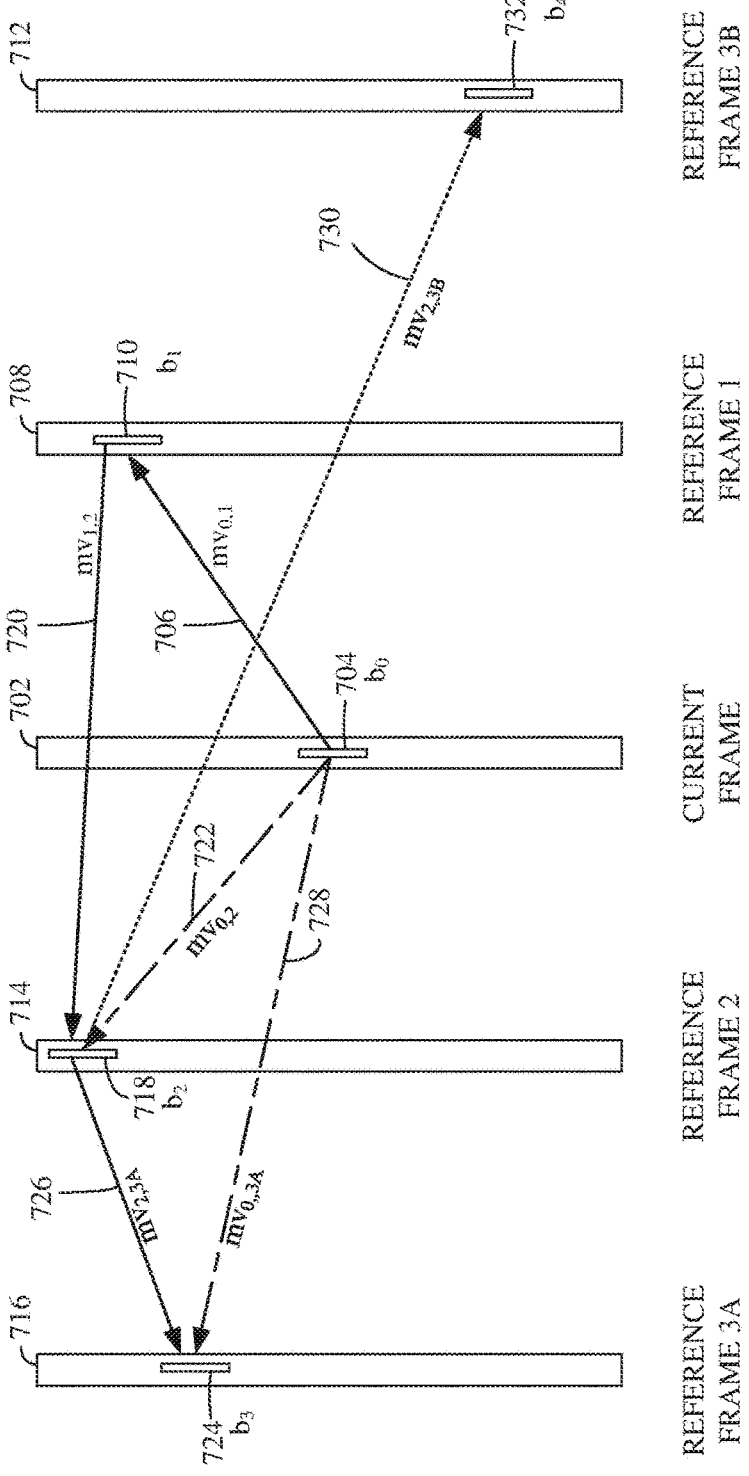
FIG. 7 is a diagram for describing multi-frame motion compensation synthesis.

FIG. 7 is a diagram 700 for describing multi-frame motion compensation synthesis. The diagram 700 includes a current frame 702 that includes a current block 704 (block $b_0$) that is to be inter-predicted using multi-frame motion compensation synthesis. An MV 706 (i.e., $mv_{0,1}$) associated with the current block 704 points to a reference block 710 (i.e., reference block $b_1$) in reference frame 708. The diagram 700 also include reference frames 712, 714, and 716, which were previously decoded. At least some of the reference frames 712, 714, and 716 may be stored in the reference frame buffers 600 of FIG. 6 and may be available as reference frames for coding blocks of the current frame 702. As such, motion information associated with at least some of the reference frames 708, 712, 714, and 716 may be buffered and may be available to use in multi-frame motion compensation synthesis for the current block 710. For blocks of a reference frame that were inter-predicted, the motion information associated with the reference frame can include respective motion vectors and reference frames (e.g., indications thereof).

Motion information associated with the current block 704 may be obtained (e.g., determined, selected, calculated, etc.) at an encoder, such as the encoder 400 of FIG. 4, and transmitted in a compressed bitstream, such as the compressed bitstream 420 of FIG. 4, to a decoder, such as the decoder 500 of FIG. 5. The motion information can include the MV 706 and the reference frame 708. Any number of ways can be used to encode the motion information. Encoding the motion information can mean encoding data in the compressed bitstream in such a way or format that the decoder can decode such data to obtain the MV 706 and the reference frame 708, which may be, for example, a location in the reference frame buffers 600.

The encoder may determine that the best mode for encoding the current block 704 is the multi-frame motion compensation synthesis mode. The encoder may encode the mode in the compressed bitstream. The encoder may encode a syntax element corresponding to the multi-frame motion compensation synthesis mode in the header of the current block 704. The syntax element can indicate whether the decoder is or is not to perform multi-frame motion compensation synthesis. In an example, the multi-frame motion compensation synthesis mode may be encoded as a one-bit symbol, where a first value (e.g., 1) indicates that the decoder is to perform multi-frame motion compensation synthesis and a second value (e.g., 0) indicates that the decoder is not to perform multi-frame motion compensation synthesis. In another example, the multi-frame motion compensation synthesis mode may be encoded together with other prediction modes. Other ways for signaling the reference-block trajectory mode are possible.

The diagram 700 illustrates that the reference block 710 (i.e., $b_1$) was inter-predicted from a reference block 718 (i.e., reference block $b_2$) in the reference frame 714 using an MV 720 (i.e., $mv_{1,2}$). Assuming that the reference frame 714 is available as a reference frame for coding blocks of the current frame 702, then the reference block 718 can be used as a reference block for the current block 704 with an MV 722 (i.e., $mv_{0,2}$) that can be obtained using equation (1). In practice, reference blocks are identified by first identifying (or using) motion vectors. A motion vector points to (e.g., references) a location in a reference frame. Thus, a motion vector is used to identify (e.g., locate) and obtain pixels in the reference block.

$$mv_{0,2} = mv_{0,1} + mv_{1,2} \qquad (1)$$

As described above, in some situations, two motion vectors may be associated with a block (such as in the case of an inter-inter compound prediction). The reference block 718 illustrates such an example. Two motion vectors (i.e., an MV 726 and an MV 730) are associated with the reference block 718. The buffered motion information associated with the reference block 718 indicates that the reference block 718 was inter-predicted from a reference block 724 (i.e., reference block $b_3$) in the reference frame 716 using an MV 726 (i.e., $mv_{2,3A}$) and a reference block 732 (i.e., reference block $b_4$) in the reference frame 712 using the MV 730 (i.e., $mv_{2,3B}$).

In an example, inter-prediction using the multi-frame motion compensation synthesis mode may select one of the reference blocks 724 and 732 to continue the reference-block trajectory. In an example, an order of selection may be associated with the reference frames according to their roles (labels) with respect to the current frame 702. For example, a closer reference frame (e.g., a LAST frame) may be selected over a further reference frame (e.g., LAST2 or LAST3 frame). In another example, which of the reference blocks to use to continue the trajectory may be indicated (e.g., signaled) in the compressed bitstream.

In some situations, a grid-aligned block may be inter-predicted using more than one motion vector. In an example, if a grid-aligned block is predicted using multi-frame MCP, then the transmitted (e.g., indicated) MV associated with the block may be used to perform multi-frame motion compensation. If a reference block is no longer available (such as in the case where the reference frame of the reference block is not available as a reference frame for the current block), other possible candidate MVs can be considered. If no candidate MVs are available, then multi-frame motion compensation stops and the prediction block may be obtained (e.g., built) only with the blocks that are available.

Assuming that the reference frame 716 is available as a reference frame for coding blocks of the current frame 702 and that the reference frame 716 is selected, then the reference block 724 can be used as a reference block for the current block 704 with an MV 728 (i.e., $mv_{0,3A}$) that can be obtained using equation (2):

$$mv_{0,3} = mv_{0,2} + mv_{2,3A} \qquad (2)$$

The above-described operations can be performed iteratively to obtain a trajectory of reference blocks by following the motion vector of a first reference block to identify a second reference block in a second reference frame, using the motion vector of the second reference block to identify a third reference block in a third reference frame, and so on. All the identified reference blocks can be combined, such as described below, to obtain a prediction block for the current block 704.

While not illustrated in FIG. 7, two motion vectors may be associated with the current block 704 (such as described with respect to compound prediction). As such the compressed bitstream can include two motion vectors and reference frames for the current block 704. The compressed bitstream may include syntax elements indicating that the decoder is to perform compound prediction in addition to multi-frame motion compensation synthesis. As such, the decoder can perform multi-frame motion compensation synthesis for each of the motion vectors (i.e., independently traversing two different trajectories) resulting in two prediction blocks. The two prediction blocks can then be combined according to the semantics of the compound prediction mode.

The semantics of the compound prediction mode mean the rules, algorithms, or formulae (collectively rules) defined for the compound prediction mode. The semantics (i.e., which rules to use) may be signaled in the compressed bitstream. To illustrate, one compound prediction mode may indicate that the corresponding pixels of the prediction blocks are to be averaged to obtain the prediction block; and another compound prediction mode may indicate that a first portion of the prediction block is to be populated from pixels of one of the prediction blocks and the remaining portion is to be populated from pixels of the other prediction block. Other semantics are possible.

As can be appreciated from the foregoing, to perform multi-frame motion compensation, only motion vectors of the current block need to be transmitted in the compressed bitstream. All other motion vectors do not incur a rate cost since they are derived from already decoded motion vectors. As such, multi-frame motion compensation yields the same rate cost as single-reference (or a two-reference) MCP. Additionally, as described above, since all motion vectors except for $mv_{0,1}$ are derived directly from decoded motion vectors, multi-frame motion compensation requires no additional computational cost at the decoder, and yields the same motion search complexity at the encoder as single-reference (or a two-reference) MCP.

In some situations (i.e., when certain conditions are present or true), it may not be possible to perform multi-frame motion compensation synthesis at the decoder. The decoder may test for the presence of such conditions. If the decoder determines that any of the conditions are present, then the compressed bitstream would not include the syntax element and the decoder infers (rather than decodes from the compressed bitstream) that the decoder is not to perform multi-frame motion compensation synthesis. As the encoder includes the same information as the decoder, then if the encoder determines that any of the conditions is present, then the encoder omits encoding the syntax element corresponding to the multi-frame motion compensation synthesis mode in the compressed bitstream.

One condition corresponds to whether an initial reference block of the current block is intra-predicted. For example, if the reference block 710 is intra-predicted (or more broadly, is not inter-predicted), then multi-frame motion compensation synthesis can't be performed and the compressed bitstream omits any syntax elements related to the multi-frame motion compensation synthesis mode. Another condition relates to whether a reference frame of the initial reference block is available as a reference frame for coding blocks of the current frame. For example, if the reference frame 714 is not in the reference frame buffers, then a trajectory from the reference block 710 to the reference block 718 wouldn't be possible. As such, multi-frame motion compensation synthesis can't be performed and the compressed bitstream omits any syntax elements related to the multi-frame motion compensation synthesis mode.

Initial reference block and initial reference frame refer to the reference block and the reference frame directly obtained based on motion information explicitly coded for the current block (e.g., the MV 706 and the reference frame 708). Said another way, the initial reference block and the initial reference frame are used for a first hop that starts at the current block in the reference block trajectory.

For simplicity of explanation, the reference blocks 710 and 718 of FIG. 7 are described as having (or as being associated with) motion vectors. However, that may not necessarily be the case. As is known, and as described with respect to FIG. 3, a frame may be partitioned into blocks and prediction blocks are obtained for those blocks. The blocks of a frame that are predicted actually exist in the frame. More specifically, pixels and pixel values of those blocks exist for those blocks. The blocks that actually exist in a frame are referred to herein as grid-aligned blocks. As is also known, reference blocks (such as the reference blocks 710 and 718 of FIG. 7) may not be grid-aligned.

In some situations, and as is known, the prediction block that results in a best residual may not correspond with (i.e., aligned with) pixels in the reference frame (i.e., may not be grid-aligned). That is, the best MV may point to a location that is between pixels of blocks in the reference frame. In this case, MCP at the sub-pixel level is useful. Motion compensated prediction may involve the use of an interpolation filter that generates filtered sub-pixel values at defined locations between the full pixels (also called integer pixels) along rows, columns, or both. The interpolation filter may be one of a number of interpolation filters available for use in MCP, where each of the interpolation filters has a different frequency profile. In such situations, the MV may be referred as a sub-pixel MV and/or the reference block may be referred to as a sub-pixel aligned reference block (or, for brevity, sub-pixel reference block).

Figure 8:
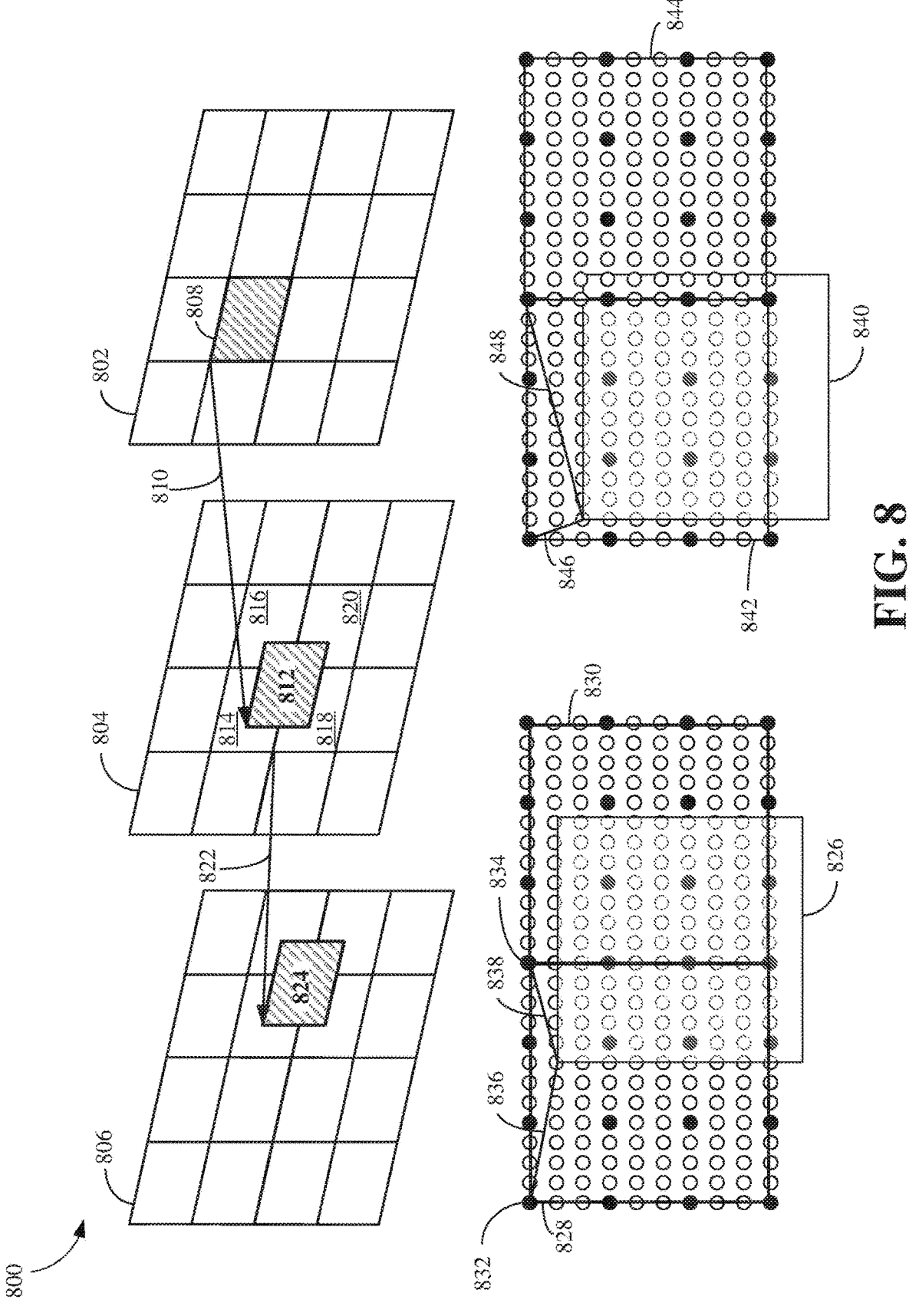
FIG. 8 is a diagram of obtaining multi-frame motion compensation synthesis when sub-pixel reference blocks are encountered along the trajectory of reference-blocks.

FIG. 8 is a diagram 800 of obtaining multi-frame motion compensation synthesis when sub-pixel reference blocks are encountered along the trajectory of reference-blocks. The diagram 800 includes a current frame 802, and reference frames 804 and 806. The frames 802-806 can be, respectively, the frames 702, 708, and 714 of FIG. 7. A current block 808 is coded using the multi-frame motion compensation synthesis mode.

An MV 810 of the current block 808 is a sub-pixel MV. As such, a reference block 812 in the reference frame 804 is a sub-pixel reference block. In an example, the reference block 812 itself can be used as one of the prediction blocks (i.e., one of the hypotheses) for the current block 808. In another example, a proximal grid-aligned block can be used as the prediction block. More generally, in an example, the reference blocks (whether grid-aligned or not) are used as the prediction blocks to be combined; in another example, grid-aligned blocks proximal to the reference blocks are used as the prediction blocks. In an example, whether to use the reference blocks or proximal grid-aligned blocks as prediction blocks can be signaled in the compressed bitstream.

In an example, a proximal grid-aligned block of a reference block can be identified in a block search area surrounding the reference block. The block search area can be a 2×2 area, a 4×4 area, or some other search area surrounding the reference block. When the search is a 2×2 area, then the search area covers only the grid-aligned blocks that are at least partially overlapped by the reference block. To illustrate, considering the reference block 812, a proximal grid-aligned block, in a 2×2 block search area, can be one of the blocks 814, 816, 818, or 820. In an example, the grid-aligned blocks of the block search area can be visited in an order (e.g., a raster scan order) to identify a grid-aligned block that is inter-predicted and whose reference frame is available for coding blocks of the current frame. The diagram 800 illustrates that the block 818 is such a block. As such, a motion vector 822 of the block 818 is used to perform a next hop of the trajectory and identify a reference block 824 in the reference frame 806. While not specifically shown in FIG. 8, the same steps may be performed with respect to the reference block 824, which is also a sub-pixel reference block.

In another example, a closest grid-aligned block proximal to a reference block may be selected for a next hop of the trajectory of reference blocks. A reference block 826 may overlap with four grid-aligned blocks, only two such grid-aligned blocks, namely blocks 828 and 830, are shown in FIG. 8. Pixels represented by black-filled circles in FIG. 8, such as pixel 832 and 834, are integer pixels; and pixels represented by white-filled circles are at sub-pixel locations. The blocks 828 and 830 are shown as being 4×4 pixels. However the disclosure is not so limited and blocks (e.g., prediction blocks) can be of any size.

The grid-aligned block corresponding to the shortest distance to the reference block can be selected for the next hop. The distance between a reference block and a grid-aligned block can be measured between two co-located pixels. FIG. 8 illustrates that the distance is measured between the top-left pixels of blocks. Distances 836 and 838 are the distances between the reference block 826 and the blocks 828 and 830, respectively. As the distance 836 is smaller than the distance 838, the block 830 would be selected for the next hop. If the reference block 826 were the reference block 812, then the block 830 would correspond to the block 816.

Contrastingly, with respect to a reference block 840 and blocks 842 and 844 (which are grid-aligned blocks), a distance 846 between the reference block 840 and the block 842 is smaller than a distance 848 between the reference block 840 and the block 844. As such, the block 842 would be selected. Again, if the reference block 826 were the reference block 812, then the block 842 would correspond to the block 814.

In another example, the grid-aligned block may be identified using the motion vector that references the reference block. As is known, a motion vector may be coded using a fractional precision (e.g., ⅛ pel or ¼ pel). For example, a motion vector may be coded using a number of bits where, for example, the three least significant bits can indicate the precision. As such, the grid-aligned block may be obtained by ignoring the fractional precision part of the motion vector.

In another example, the encoder may determine, and encode in the bitstream, the grid-aligned block that the decoder is to use. For example, the encoder can select the grid-aligned block from amongst possible grid-aligned blocks based on which of the possible grid-aligned blocks results in a best prediction (e.g., least distortion or smallest residual) for the current block.

In another example, the decoder can select the grid-aligned block from amongst possible grid-aligned blocks based on which of the possible grid-aligned blocks results in a smallest error between the reference block and the possible grid-aligned blocks. The error between a reference block and a possible grid-aligned block can be a mean square error (MSE) between pixel values of the respective blocks. The error can be a sum of absolute differences (SAD) error between the pixel values. Any other suitable error measure can be used.

In another example, the decoder can select the grid-aligned block from amongst possible grid-aligned blocks based on which of the possible grid-aligned blocks results in a smallest error between the reference block and the initial reference block.

In an example, all of the possible grid-aligned blocks can be used. As such, the trajectory can then split into multiple trajectories therewith increasing the number of hypotheses (i.e., prediction blocks) that are ultimately combined to obtain the prediction block for the current block.

Multi-frame motion compensation synthesis may stop when one or more trajectory stopping criteria are met. A stopping criterion may be that none of the possible grid-aligned blocks are associated with motions vectors, such as when the possible grid-aligned blocks are all intra-predicted. Another stopping criterion may be that the respective reference blocks of the grid-aligned blocks are sufficiently different from the current block. For example, if the errors between the respective reference blocks of the grid-aligned blocks and the current block exceed an error threshold, then multi-frame motion compensation synthesis stops. To illustrate, if the difference between the reference block 724 and the current block 704 of FIG. 7 exceeds an error threshold, then the MV 726 would not be followed, and the trajectory stops at the reference block 718. Another stopping criterion may be that a threshold number of hops has been met (or, equivalently, that a threshold number of prediction blocks have been identified). In an example, the threshold number of projections may be signaled by an encoder in the compressed bitstream.

Having obtained the prediction blocks by following the trajectory of reference blocks, the prediction blocks are now combined. Any one, or a combination, of a number of techniques can be used to combine the prediction blocks.

Assuming that N prediction blocks $B_1$, $B_2$, . . . , $B_N$ are obtained, the prediction blocks can be synthesized (combined) into a prediction block $B_0$. As mentioned above, the prediction blocks $B_i$ can be reference blocks (i.e., $b_i$) or grid-aligned blocks.

In an example, a linear combination of the pixels in the prediction blocks can be obtained using equation (3), where $\hat{p}_i$ is a vector of reconstructed pixels in the prediction block $B_i$ and $\tilde{p}_0$ is the resulting prediction of the pixels in $B_0$. The weight corresponding to prediction block $B_i$ is denoted by $w_i$.

$$\tilde{p}_0 = \sum_{i=1}^{N} w_i \hat{p}_i \tag{3}$$

In an example, the prediction blocks are averaged together where each of the weights $w_i$ can be calculated as $w_i = 1/N$. Under this model, the prediction blocks may be assumed to be equally good (e.g., equally predictive), and each of prediction blocks may contain the same level of noise (independent and identically distributed noise) in their respective reconstructions.

In another example, the weights $w_i$ can be distance based. This model assumes that the farther in time (e.g., in display time) a reference frame is to the current frame, the lower the correlation between the pixels of the reference frame and the current frame. Said another way, the correlation of pixels along the motion trajectory tends to decrease as the distance in time increases. Under this model, the weights can be obtained using, for example, the exponential model of equation (4a), where $Dist_i$ can be the absolute value of time difference between a reference frame $f_i$ and the current frame $f_0$, and $\alpha$ can be an empirically derived parameter that controls the impact of distance in the model. The absolute value of time difference for two frames can be difference in respective display indices associated the two frames.

$$w_i = \frac{e^{-\alpha Dist_i}}{\sum_{k=1}^{N} e^{-\alpha Dist_k}} \quad (4a)$$

In another example of distance-based weight selection (e.g., calculation), equation (4b) can be used. In equation (4b), the inverse of the time differences between frame reference frames $f_i$ and the current frame $f_0$ are used to calculate the weights.

$$w_i = \frac{1/Dist_i}{\sum_{k=1}^{N} 1/Dist_k} \quad (4b)$$

In another example, the weights $w_i$ can be adaptively set. The weights can be set by measuring the sum of pixel value differences between the initial reference block $b_1$ (or the initial prediction block $B_1$) and other reference blocks $b_i$ (or prediction blocks $B_i$). This model assumes that the initial reference (or prediction) block is likely to be the most reliable prediction of the current block $b_0$. As such, the initial block can be used as an "anchor" to measure the noise level in other reference (or prediction) blocks. An exponential model according to equation (5) can be used to obtain the weights, where $D_i$ is the error between the initial reference block $b_1$ (or an initial prediction block $B_1$ obtained from therefrom), as the reference block $b_i$ (or the prediction block $B_i$ obtained therefrom), $\beta$ can be an empirically derived parameter that is used to control the sensitivity of the model, and M is the number of pixels in each block.

$$w_i = \frac{e^{-\beta D_i/M}}{\sum_{k=1}^{N} e^{-\beta D_k/M}} \quad (5)$$

In equation (3), a same weight $w_i$ is used for all pixels of a prediction block. However, other weight calculation techniques are possible where a respective weight can be obtained for each pixel of each prediction block. For examples, a model that evaluates similarities between pixel values of the predictions can be used to determine the pixel weights. The model can be auto-regression model, a hidden-Markov model, or some other model capable of evaluating similarities between co-located pixel values of the prediction blocks.

In an example, non-local means or similar techniques can be used to derive the weights using the values of the pixels of the prediction blocks themselves. Alternatively, the weights described above can be modulated using the values of the pixels of the prediction blocks themselves. In yet another example, the weights can be transmitted from the encoder to the decoder in the bitstream and the decoder can modulate the weights as described below. The weights described above, or weights transmitted in the compressed bitstream, can be used as, or considered to be, baseline weights that are further modulated. It is noted that transmitting weights in the compressed bitstream includes transmitting an index into a lookup table of weights. That is, the decoder can use the index to look up the baseline weights in the lookup table.

In an example, a smoothness of each prediction block around each pixel of the prediction block can be used to determine the weighting or to modulate a baseline weight. For illustration purposes, assume that there are two prediction blocks to be combined. A characteristic used for modulating the weighting can be a first smoothness about a first pixel of a first prediction block and a second smoothness about the second co-located pixel of a second prediction block.

The smoothness around a pixel can be indicative of noise around the pixel. For example, the higher the smoothness, the lower the noise; and the lower the smoothness, the higher the noise. If the local smoothness around a pixel location of one prediction block is higher than the local smoothness at the same pixel location of the other prediction block, the former prediction block may have a greater weight applied to its pixel value. Alternatively, when a baseline weight is used, the baseline weight for a smoother predictor pixel can be adjusted or modulated upward. The smoothness at a pixel position can be determined by examining the surrounding pixels. For example, smoothness at a pixel position can be determined using, for example, a 3×3 window centered at the pixel position. Any window size can be used. The smoothness around a pixel can be determined using statistics (e.g., range, standard deviation, etc.) of the 3×3 window around the pixel. Other methods for determining the smoothness can be used. The relative values of the first smoothness and the second smoothness can be used to modulate the baseline weights of the prediction blocks. For example, equation (6) can be used to modulate the baseline weights:

$$(6)$$

$$\begin{cases} modulated1(r, c) = \dfrac{smoothness1(r, c)}{(smoothness1(r, c) + smoothness2(r, c))} * weight \\ modulated2(r, c) = \dfrac{smoothness2(r, c)}{(smoothness1(r, c) + smoothness2(r, c))} * (1 - weight) \end{cases}$$

In equation (6), modulated1(r,c) is the modulated weight of a baseline weight (weight) for a first pixel at position (r,c) of the first prediction block, modulated2(r,c) is the modulated weight for a second pixel at position (r,c) of the second prediction block, smoothness1(r,c) is the smoothness at the first pixel position, and smoothness2(r.c) is the smoothness at the second pixel position.

Any of the above or additional weight determining models may be available at a codec. At the encoder, a rate-distortion (R-D) optimization can be performed for the current block by comparing the estimated R-D costs of the available weight determining models. The R-D costs can be compared with those of other available prediction modes to determine whether the multi-frame motion compensation synthesis mode should be used. The encoder may also encode the weight determining model that the decoder should use.

FIG. 9 is an example of a flowchart of a technique 900 for obtaining a prediction of a current block using multi-frame motion compensation synthesis. The technique 900 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 900. The technique 900 may be implemented in whole or in part in the intra/inter prediction stage 508 of the decoder 500 of FIG. 5. The technique 900 can be implemented using specialized hardware or firmware. Multiple processors, memories, or both, may be used.

At 902, a motion vector for the current block of the current frame can be decoded from a compressed bitstream, such as the compressed bitstream 420 of FIG. 5. The motion vector for the current block refers to (e.g., is used in conjunction with, points to, etc.) a first reference block in a first reference frame. For example, motion information may be decoded from a header of the current block. The motion information can include, or can be used to identify, the motion vector for the current block. The motion information can also include an indication of the first reference frame.

At 904, a first prediction block of two or more prediction blocks is identified in the first reference frame using the first reference block. As described above with respect to FIG. 8, the first reference block can be the reference block 812. In an example, and as described above, the first reference block (e.g., the reference block 812) can be identified (e.g., used, selected, etc.) as the first prediction block. In another example, and as also described, a first grid-aligned block (e.g., the block 818) can be identified as the first prediction block.

At 906, the first grid-aligned block can be identified based on the first reference block. The grid-aligned block can be a block of the reference frame that is overlapped by the first reference block. In an example, the grid-aligned block is identified in response to determining that the grid-aligned block is associated with a motion vector. At 908, the motion vector of the first grid-aligned block can be used to identify a second reference block in a second reference frame. To illustrate, the motion vector 822 can be used to identify the reference block 824 in the reference frame 806, as described with respect to FIG. 8.

At 910, a second prediction block of the two or more prediction blocks is identified in the second reference frame using the second reference block. As described above, the second prediction block can be the second reference block. Alternatively, the second prediction block can be a grid-aligned block that is identified as described above.

At 912, the two or more prediction blocks are combined to obtain a prediction block for the current block. In an example, combining the two or more prediction blocks can include obtaining pixel values of the prediction block by averaging respective co-located pixel values of the two or more prediction blocks. In another example, combining the two or more prediction blocks can include using a weighted combination of the two or more prediction blocks where respective weights are assigned to the two or more prediction blocks based on respective distances from the current frame. Accordingly, the weights can be obtained as described with respect to equation (4a) or equation (4b).

In another example, combining the two or more prediction blocks can include using respective weights of pixels of the two or more prediction blocks, where the respective weights of pixels of each prediction block of the two or more prediction blocks are obtained based on differences between pixel values of the first prediction block and the pixel values of the prediction block. Accordingly, the weights can be obtained as described with respect to equation (5). In yet another example, the respective weights for the two or more prediction blocks can be decoded from the compressed bitstream.

In an example, the technique 900 can also include determining that the second prediction block is inter-predicted. Responsive to the determination that the second prediction block is inter-predicted, a second grid-aligned block based on the second reference block can be identified. A third reference block can be identified in a third reference frame using a motion vector of the second grid-aligned block. A third prediction block can be identified in the second reference frame using the third reference block. The third prediction block can be added to the two or more prediction blocks. That is the third prediction block is combined with the first prediction block and the second prediction block to obtain the prediction block for the current block.

In an example, the technique 900 can include decoding, from the compressed bitstream, an indication to obtain the two or more prediction blocks. That is, the technique 900 can decode one or more syntax elements indicating that the multi-frame motion compensation synthesis mode is to be performed for the current block. In an example, the technique 900 determines to obtain the two or more prediction blocks in response to determining that the first grid-aligned block is inter-predicted.

FIG. 10 is another example of a flowchart of a technique 1000 for obtaining a prediction of a current block using multi-frame motion compensation synthesis. The technique 1000 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 1000. The technique 1000 may be implemented in whole or in part in the intra/inter prediction stage 402 of the encoder 400 of FIG. 4 or the intra/inter prediction stage 508 of the decoder 500 of FIG. 5. The technique 1000 can be implemented using specialized hardware or firmware. Multiple processors, memories, or both, may be used.

At 1002, a motion vector for the current block of the current frame is coded. The motion vector refers to a first reference block in a first reference frame. When the technique 1000 is implemented by a decoder, identifying the motion vector can include decoding the motion vector from a compressed bitstream. When the technique 1000 is implemented by an encoder, identifying the motion vector can include selecting (e.g., choosing, etc.) the motion vector and encoding the motion vector in the compressed bitstream.

At 1004, a first grid-aligned block is identified in the first reference frame based on the first reference block. The first grid-aligned block can be identified as described above. At 1006, a second reference block in a second reference frame is identified using a motion vector of the first grid-aligned block. The second reference block is the block in the second reference that is pointed to by the motion vector of the first grid-aligned block. As described above, the first grid-aligned block is an inter-predicted block.

At 1008, the first reference block and the second reference block are combined to obtain a prediction block for the current block. The first reference block and the second reference block can be combined as described above.

When implemented in the encoder, the technique 1000 can include encoding, in the compressed bitstream, a prediction mode indicating that the first reference frame and the second reference frame are to be identified. That is, the technique 1000 encodes the one or more syntax elements indicating that the multi-frame motion compensation synthesis mode is to be carried out to predict the current block. When implemented in the decoder, the technique 1000 can include decoding, from the compressed bitstream, a prediction mode indicating that the first reference frame and the second reference frame are to be identified.

In an example, the technique 1000 can include determining that a third reference frame that is used to code blocks of the second reference frame is also available for coding blocks of the current frame. Responsive to the determination, a second grid-aligned block is identified based on the second reference block. A third reference block is identified in the third reference frame using a motion vector of the second grid-aligned block. In this case, the first reference block, the second reference block, and the third reference block are combined to obtain the prediction block for the current block.

In an example, the technique 1000 obtains at least two reference blocks that include the first reference block and the second reference block in response to determining that the first grid-aligned block is inter-predicted. The at least two reference blocks can be combined to obtain the prediction block for the current block.

FIG. 11 is another example of a flowchart of a technique 1100 for obtaining a prediction of a current block using multi-frame motion compensation synthesis. The technique 1100 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 1100. The technique 1100 may be implemented in whole or in part in the intra/inter prediction stage 402 of the encoder 400 of FIG. 4 or the intra/inter prediction stage 508 of the decoder 500 of FIG. 5. The technique 1100 can be implemented using specialized hardware or firmware. Multiple processors, memories, or both, may be used.

At 1102, the technique 1100 determines to obtain a prediction block for a current block by traversing a trajectory of reference blocks. When the technique 1100 is implemented by a decoder, the determination is made in response to decoding, from a compressed bitstream, an indication to obtain the prediction block for the current block by traversing the trajectory of reference blocks. When the technique 1100 is implemented by an encoder, the encoder may make the determination based on determining R-D costs associated with different modes of encoding the current block and determining that the mode corresponding to traversing the trajectory of reference blocks results in the optimal R-D cost.

At 1104, motion information for the current block are identified. The motion information can include a motion vector and a first reference frame. When implemented by a decoder, identifying the motion information can mean decoding the motion information from the compressed bitstream. At 1106, two or more prediction blocks in respective reference frames are obtained by following the trajectory of reference blocks, such as described with respect to FIG. 8 or 9. As such, the trajectory can identify a first reference block in the first reference frame and uses a grid-aligned block proximal to the first reference block to identify a second reference block in a second reference frame that is used for coding blocks of the first reference frame. At 1108, the two or more prediction blocks are combined to obtain the prediction block for the current block. The two or more prediction blocks can be combined as described above.

For simplicity of explanation, the methods described herein, such as the techniques 900, 1000, 1100 of FIGS. 9, 10, and 11, respectively, are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
decoding a motion vector for a current block of a current frame, wherein the motion vector for the current block refers to a first reference block in a first reference frame;
identifying, in the first reference frame and using the first reference block, a first prediction block of two or more prediction blocks;
identifying a first grid-aligned block based on the first reference block;
identifying, using a motion vector of the first grid-aligned block that refers to a second reference frame, a second reference block in the second reference frame;
identifying, in the second reference frame and using the second reference block, a second prediction block of the two or more prediction blocks; and
combining the two or more prediction blocks to obtain a prediction block for the current block.

2. The method of claim 1, wherein the first reference block is identified as the first prediction block.

3. The method of claim 1, wherein the first grid-aligned block is identified as the first prediction block.

4. The method of claim 1, further comprising:
determining that the second prediction block is inter-predicted;
responsive to the determination that the second prediction block is inter-predicted, performing steps comprising:

identifying a second grid-aligned block based on the second reference block;
identifying, using a motion vector of the second grid-aligned block, a third reference block in a third reference frame;
identifying a third prediction block in the second reference frame using the third reference block; and
adding the third prediction block to the two or more prediction blocks.

5. The method of claim 1, further comprising:
determining to obtain the two or more prediction blocks in response to determining that the first grid-aligned block is inter-predicted.

6. The method of claim 1, wherein combining the two or more prediction blocks to obtain the prediction block for the current block comprises:
combining the two or more prediction blocks using a weighted combination of the two or more prediction blocks, wherein respective weights are assigned to the two or more prediction blocks based on respective distances from the current frame.

7. The method of claim 1, wherein combining the two or more prediction blocks to obtain the prediction block for the current block comprises:
combining the two or more prediction blocks using respective weights of pixels of the two or more prediction blocks, wherein the respective weights of pixels of each prediction block of the two or more prediction blocks are obtained based on differences between pixel values of the first prediction block and the pixel values of the each prediction block.

8. The method of claim 1, wherein combining the two or more prediction blocks to obtain the prediction block for the current block comprises:
decoding, from a compressed bitstream, respective weights for the two or more prediction blocks; and
combining the two or more prediction blocks using the respective weights.

9. A device, comprising:
a processor that is configured to:
identify a motion vector for a current block of a current frame, wherein the motion vector refers to a first reference block in a first reference frame;
identify a first grid-aligned block in the first reference frame based on the first reference block;
identify, using a motion vector of the first grid-aligned block that refers to a second reference frame, a second reference block in the second reference frame; and
combine the first reference block and the second reference block to obtain a prediction block for the current block.

10. The device of claim 9, further comprising:
encode, in a compressed bitstream, a prediction mode indicating that the first reference frame and the second reference frame are to be identified.

11. The device of claim 9, further comprising:
decode, from a compressed bitstream, a prediction mode indicating that the first reference frame and the second reference frame are to be identified.

12. The device of claim 9, wherein the processor is further configured to:
determine that a third reference frame that is used to code blocks of the second reference frame is also available for coding blocks of the current frame; and
responsive to the determination:

identify a second grid-aligned block based on the second reference block; and identify, using a motion vector of the second grid-aligned block, a third reference block in the third reference frame.

13. The device of claim 12, wherein to combine the first reference block and the second reference block to obtain the prediction block for the current block comprises:

combine the first reference block, the second reference block, and the third reference block to obtain the prediction block for the current block.

14. The device of claim 9, wherein the processor is further configured to:

obtain at least two reference blocks including the first reference block and the second reference block in response to determining that the first grid-aligned block is inter-predicted, wherein the at least two reference blocks are combined to obtain the prediction block for the current block.

15. The device of claim 9, wherein to combine the first reference block and the second reference block to obtain the prediction block for the current block comprises:

obtain pixel values of the prediction block by averaging respective co-located pixel values of the first reference block and the second reference block.

16. The device of claim 9, wherein to combine the first reference block and the second reference block to obtain the prediction block for the current block comprises:

combine the first reference block and the second reference block using a weighted combination of the first reference block and the second reference block, wherein respective weights are assigned to the first reference block and the second reference block based on respective distances from the current frame.

17. The device of claim 9, wherein to combine the first reference block and the second reference block to obtain the prediction block for the current block comprises:

combine the first reference block and the second reference block using respective weights of pixels of the first reference block and the second reference block, wherein weights of pixels of each of the first reference block and the second reference block are obtained based on differences between pixel values of the first reference block and pixel values of the second reference block.

18. The device of claim 14, wherein to combine the first reference block and the second reference block to obtain the prediction block for the current block comprises:

decode, from a compressed bitstream, respective weights for the at least two reference blocks; and combine the at least two reference blocks using the respective weights.

19. A method, comprising:

determining to obtain a prediction block for a current block by traversing a trajectory of reference blocks;

identifying motion information for the current block, wherein the motion information includes a motion vector and a first reference frame;

obtaining two or more prediction blocks in respective reference frames by following the trajectory of reference blocks, wherein the trajectory identifies a first reference block in the first reference frame and uses a motion vector of a grid-aligned block proximal to the first reference block that refers to a second reference frame to identify a second reference block in the second reference frame that is used for coding blocks of the first reference frame; and combining the two or more prediction blocks to obtain the prediction block.

20. The method of claim 19, wherein determining to obtain the prediction block for a current block by traversing the trajectory of reference blocks comprises:

decoding, from a compressed bitstream, an indication to obtain the prediction block for the current block by traversing the trajectory of reference blocks.

* * * * *